April 7, 1970  J. M. DUDLEY  3,504,570
GEAR SHIFT DEVICE
Filed Jan. 19, 1968
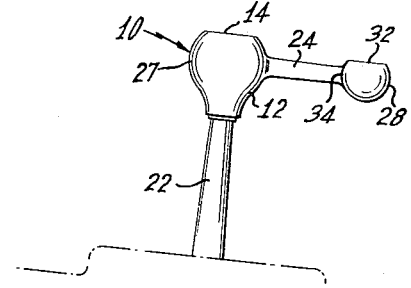
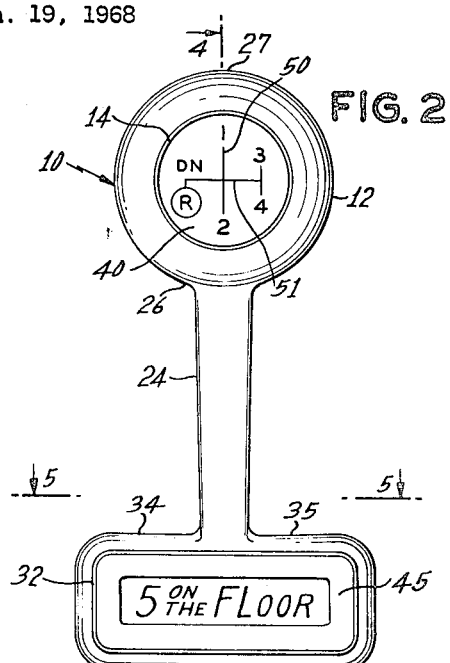
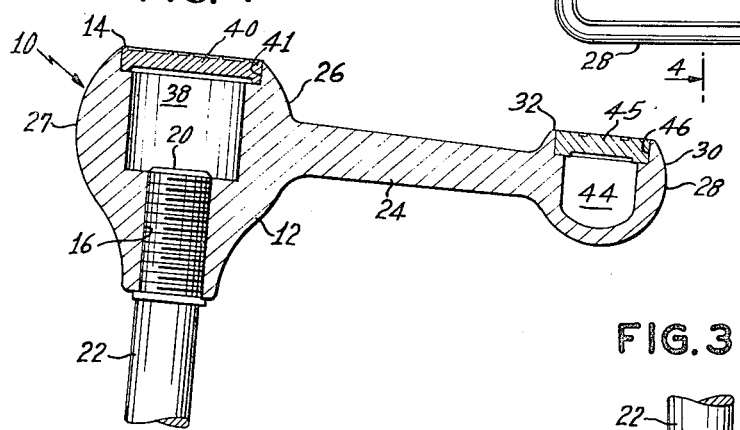
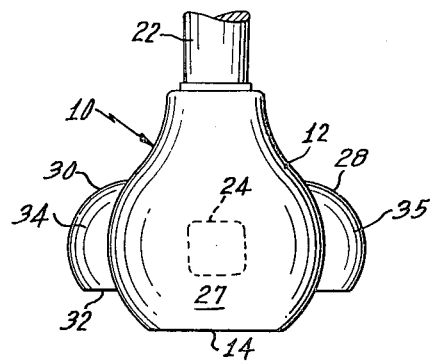
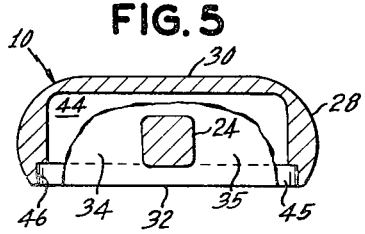
INVENTOR.
James M. Dudley
BY
George W. Baldwin
ATTORNEY United States Patent Office 3,504,570
Patented Apr. 7, 1970

3,504,570
GEAR SHIFT DEVICE
James M. Dudley, P.O. Box 8541,
Jacksonville, Fla. 33011
Filed Jan. 19, 1968, Ser. No. 699,235
Int. Cl. G05g 1/10
U.S. Cl. 74—544       4 Claims

ABSTRACT OF THE DISCLOSURE

A unitary gear shift device threadedly attached to the upper end of an upstanding gear shift lever including a knob above the lever which has an enlarged flat surface at the top thereof. A shank extends rearwardly from the knob and a handle is attached thereto transversely thereof for forming a T-shaped handle spaced rearwardly of the knob for engagement by the operator's hand for shifting the gears primarily into the forward or neutral positions. The handle has a flat upper surface to more nearly conform to the operator's hand. A gear shift pattern is associated with the flat surface on the knob and such flat surface is primarily engaged by the palm of the operator's hand during depression of the lever downwardly to shift the gears into reverse position.

BACKGROUND OF THE INVENTION

Field of the invention

This invention relates to gear shift devices and more particularly to a gear shift device for attachment to an upstanding gear shift lever of a manually shiftable transmission of a vehicle.

The present invention is directed to an improved gear shift device which assists an operator in the shifting of an upright gear shift lever.

Description of the prior art

Knobs of various configurations have been employed at the top of an upstanding gear shift lever. The most common knob is, of course, enlarged and of a generally rounded configuration. There have been extension knobs for upstanding gear shift levers which are threadedly connected to the upper end of the lever, curving upwardly and rearwardly and terminating in an enlarged knob of a generally rounded configuration. The knobs of the prior art haven't been satisfactory, particularly for the type transmission which requires depression of the gear shift lever to move the gears into reverse position nor in providing for two graspable handles for operators having differing arm lengths rendering the shifting of gears more readily maneuverable.

SUMMARY

This invention relates to a gear shift device for attachment to an upright gear shift lever of a manually shiftable transmission of a vehicle, including in one of its aspects an enlarged body portion above the lever and means for attaching the body portion to the upper end of the lever. A shank portion extends rearwardly from the body portion and a handle portion is disposed on the shank portion spaced rearwardly from the body portion. The handle portion is adapted for engagement by the hand of the operator for the shifting of the lever into any of the forward and neutral gear positions while the body portion is adapted for engagement for the shifting of the lever into the reverse gear position and/or any of the forward and neutral gear positions.

The means for attaching the body portion includes an inwardly threaded portion adapted for releasable threaded engagement with the outward threaded upper end of the lever.

In another of the aspects of the invention the handle portion includes a generally horizontal element extending transversely of the shank and forming therewith a T-shaped handle for firmly grasping by the operator's hand. The upper surface of the element is substantially planar and horizontally disposed to more readily conform to the part of the operator's hand contacting such upper surface.

A further aspect of the invention resides in the body portion being generally bulbous and having a flattened generally horizontal upper surface for assuring proper contact between the palm of the hand particularly when the lever is to be depressed for shifting the gears into reverse position. Indicia means are associated with the planar upper surface of the bulbous body portion depicting the gear shift pattern of the transmission of the vehicle.

A general object of this invention is the provision of an improved gear shift device.

A particular object is to provide an improved gear shift device which may be more easily used by vehicle operators having various arm lengths.

Another particular object is the provision of an improved gear shift device which renders the depression of the gear shift lever more positive and easier to maneuver by the operator.

A specific object is to provide an improved unitary gear shift device which is sturdy in construction to withstand the substantial forces transmitted thereto by and from the operator's hand during performance of the manual shifting movements thereof.

Another specific object is to provide a pair of handles on a device for attachment to an upstanding gear shift lever in which the grasping of one or another handle is unimpeded by the presence of the other.

Other objects of the present invention include the construction thereof in a simple and inexpensive manner and the efficiency thereof in use.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

FIG. 1 is a side elevational view of the gear shift device in accord with the invention, the device being shown as mounted to an upstanding gear shift lever of a transmission of a vehicle (not shown);

FIG. 2 is a top plan view of the device;

FIG. 3 is a front elevational view of the device;

FIG. 4 is a longitudinal cross-sectional view of the device taken along line 4—4 of FIG. 2; and FIG. 5 is a transverse cross-sectional view of the device taken along line 5—5 of FIG. 2, parts being broken away for clarity.

DESCRIPTION OF THE PREFERRED EMBODIMENT

Referring now more particularly to the drawing, the gear shift device is generally indicated at 10 and includes an enlarged knob or body portion 12, specifically shown as being bulbous in shape, with a flattened generally horizontal and planar surface portion 14 adjacently above the internally threaded portion 16, portion 16 being adapted for releasable threaded attachment to the reduced and externally threaded upper end 20 of gear shift lever 22, as specifically shown in FIG. 4. Gear shift lever 22 may be considered to be any upright lever for shifting gears of a manually shiftable transmission of a vehicle into various positions. The transmission and vehicle form no part of the present invention and need not be depicted or described, except as to the gear shift lever 22 to which the present invention is attached. The indicia 50, shown in FIG. 2, associated with the planar surface portion 14 depicts the common Volkswagen vehicular transmission shift pattern, as hereinafter more fully described.

A shank portion 24 is herein disclosed as being unitary with body portion 12 and extends rearwardly of the rear surface 26 of body portion 12 and toward the rear of the vehicle (not shown). A handle portion 28 is disclosed herein as being unitary with shank 24 spaced rearwardly of said body portion 12, handle portion 28 including a generally horizontal element 30 extending approximately perpendicular or transverse of shank 24 and forming a generally T-shaped handle therewith.

Handle portion 28 includes an upper horizontal and planar surface 32 which conforms with the portion of the palm of the hand of the operator which is closely adjacent the base of the fingers, the fingers being adapted to contact and partially encircle the front portions 34 and 35 of handle portion 28 and to straddle the shank 24. Alternatively, the surface 32 may be contacted by the fingers generally between the base joint and the middle joint with the ends of the fingers encircling the front portions 34 and 35 of the handle portion 28. When the operator desires to shift gears into any of the forward positions, identified as 1, 2, 3 and 4 by indicia 50, or into neutral, identified by line 51, the horizontal element 30 is grasped by the fingers of the operator's hand and moved either forwardly, rearwardly and/or sideways as is commonly known.

The planar surface portion 14 is adapted to be engaged by the palm of the hand with or without the fingers of the operator partially encircling the body portion 12 adjacent its front surface 27. When the operator desires to move the gear shift lever 22 into the reverse position shown by R of indicia 50, the operator's palm engages against planar surface portion 14 and forcibly depresses the device 10 and gear shift lever 22 to move same into the reverse position indicated by R. The operator may also grasp body portion 12 to move lever 22 into any of the forward or neutral positions.

Shank 24 adjacent body portion 12 has an approximate square cross-sectional shape, shank 24 tapering rearwardly to a smaller and an approximate square cross-sectional shape adjacent handle portion 28.

The body portion 12 includes a cavity 38 above threaded portion 16 primarily to decrease the weight of the device 10. An indicia bearing disc 40 is affixed in depression 41 as by friction, welding, gluing or heat sealing depending on the materials used in the manufacturing of the device 10. Similarly, handle portion 28 includes a cavity 44 therein with an indica bearing insert 45 affixed in depression 46 above cavity 44.

It is to be understood that the indicia bearing disc 40 and indicia bearing insert 45 could be made in any manner common in the art as by stamping, moulding or painting the indicia therein, if made of a metal, or moulding or painting thereof, if made of a plastic material. Similarly, if the disc 40 and insert 45 were of clear or transparent plastic, for example, an indicia bearing paper or plastic may be disposed beneath the disc and insert in a manner known in the art witth the indicia being sensed by viewing through the transparent plastic.

It will be apparent that the device in accord with this invention is preferably unitary in construction with the major portion thereof being of a relatively strong plastic material molded into the shape depicted, and the disc 40 and insert 45 also being of a plastic material and sealed to the major portion, as previously described.

The device 10 substantially facilitates controlling of the gear shift lever 22 by the operator. The flattened, relatively large surface portion 14 provides an improved base for the reception of the downward force of the hand of the operator during shifting into reverse than is provided by some of the normally dome shaped knobs employed on the top of many of the upstanding gear shift levers. Also, the rearwardly displaced handle portion 28 provides a more accessible handle for the operator during forward shifting movements of the gear shift lever, particularly for short persons having limited arm reaches. Heretebefore, a short person desiring to operate the vehicle would have to bend forwardly removing his back from the seat back rest to properly shift gears. By employing the device 10 in accord with the invention operators of far differing heights may effectively shift the transmission by employing only the knob portion 12 and/or the handle portion 28. For a long armed operator, handle portion 28 may not ever be used to shift the gears, but having the rearwardly spaced handle portion 28 does not in any way interfere with such a person's shifting and provides for a more accessible gear shifting operation for other operators with shorter arms.

While only a certain preferred embodiment of this invention has been shown and described by way of illustration, many modifications will occur to those skilled in the art and it is intended that all such modifications be covered within the true spirit and scope of this invention.

What is claimed as new and what it is desired to secure by Letters Patent of the United States is:

1. A gear shift device for attachment to an upstanding gear shift lever of a transmission of a vehicle comprising an enlarged bulbous body portion, means for attaching said body portion to the upper end of the gear shift lever, a shank portion connected at one of its ends to said body portion and extending outwardly of said body portion and generally in the same horizontal plane with said body position and adapted and arranged when attached to the upper end of the gear shift lever to extend rearwardly toward the rear of the vehicle, a handle portion connected to the other of the ends of said shank portion, said handle portion including a generally horizontal element extending generally perpendicular to said shank portion and forming a general T-shaped handle therewith, said T-shaped handle being adapted to be positioned in a generally horizontal plane when said body portion is attached to the upper end of the gear shift lever, said body portion being larger than the cross sectional dimensions of the gear shift lever and adapted and arranged to be engaged by the palm of the hand of the operator of the vehicle primarily when the gear shift lever is to be depressed for shifting the transmission into reverse position, said element including a generally horizontal and planar upper surface portion which conforms more readily with forward part of the operator's palm engaging same with the fingers generally encircling said element, said element being adapted and arranged to be engaged by the fingers and forward part of the palm of the hand of the operator of the vehicle when the gear shift lever is to be moved forward, backward and sideways for shifting the transmission into neutral position and any of the forward positions.

2. A gear shift device for attachment to an upstanding gear shift lever of a transmission of a vehicle comprising an enlarged body portion, means for attaching said body portion to the upper end of the gear shift lever, a shank portion connected at one of its ends to said body portion and extending outwardly of said body portion and adapted and arranged when attached to the upper end of the gear shift lever to extend rearwardly toward the rear of the vehicle, a handle portion connected to the other of the ends of said shank portion, said body portion including a generally horizontal planar upper surface portion adapted and arranged to be adjacently above the upper end of the gear shift lever and engaged by the palm of the hand of the vehicle operator, said body portion being larger than the cross sectional dimensions of the gear shift lever and adapted and arranged to be engaged by the palm of the hand of the operator of the vehicle primarily when the gear shift lever is to be depressed for shifting the transmission into reverse position, said handle portion being adapted and arranged to be engaged by the fingers of the hand of the operator of the vehicle when the gear shift lever is to be moved forward, backward and sideways for shifting the transmission into neutral position and any of the forward positions.

3. The device as defined in claim 1 wherein said body portion is generally bulbous, said shank being connected to a rearward portion of said bulbous body portion and forming with said handle portion a T-shaped handle disposed rearwardly of said bulbous body portion for grasping by the hand of the operator.

4. The device as defined in claim 1 wherein said device further comprises indicia means associated with said planar surface portion depicting the gear shift pattern of the transmission of the vehicle.

References Cited

UNITED STATES PATENTS

| | | | |
|---|---|---|---|
| 1,262,425 | 4/1918 | Young | 74—544 |
| 1,285,351 | 11/1918 | Parsons et al. | 74—544 |
| 1,409,447 | 3/1922 | Hughes | 74—544 |

MILTON KAUFMAN, Primary Examiner